Figure 1:
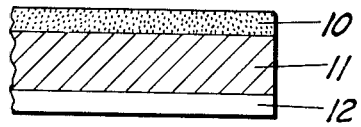
Figure 2:
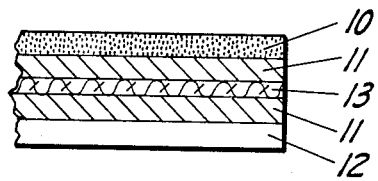

Jan. 24, 1956

J. W. KEIL 2,732,318

PRESSURE-SENSITIVE TAPES OF ORGANO-SILOXANE
MATERIAL WITH TITANIUM RELEASE COATING

Filed Oct. 7, 1954

INVENTOR.
JOSEPH W. KEIL
BY Robert F. Fleming Jr.

ATTORNEY

United States Patent Office 2,732,318
Patented Jan. 24, 1956

2,732,318

PRESSURE-SENSITIVE TAPES OF ORGANO-SILOXANE MATERIAL WITH TITANIUM RELEASE COATING

Joseph W. Keil, Midland, Mich., assignor to Dow Corning Corporation, Midland, Mich., a corporation of Michigan Application October 7, 1954, Serial No. 460,845

3 Claims. (Cl. 117—68.5)

This invention relates to siloxane pressure-sensitive tapes.

Commercially acceptable pressure-sensitive tapes utilizing organopolysiloxanes for the backing material as well as for the adhesive, are well known and enjoy an ever increasing popularity in the market. The thermal stability, dielectric properties resistance to atmospheric deterioration, chemical inertness, non-toxicity and other outstanding characteristics obtainable with organopolysiloxane pressure-sensitive tapes have assured them of continued commercial success.

Among the criteria by which a pressure-sensitive tape is judged by the consumer are the ease with which the tape can be unrolled, the amount of adhesive sticking to the backside of the backing after unrolling the tape, and the condition of the adhesive surface after unrolling. All too often, pressure-sensitive tapes deteriorate upon standing. The adhesive gradually migrates into the backside of the tape making it difficult to unwind the tape from the roll, causing the backside of the tape to be sticky and making it difficult to handle, and leaving the adhesive side of the tape depleted of adhesive and somewhat dried out thus giving less than the desired amount of adhesiveness.

Prior to this invention, the migration of the adhesive has been prevented by employing an interleaving sheet in the tape roll. This has proved to be an unsatisfactory procedure because the roll of tape unrolls too readily and requires rewinding the unused balance of the roll after every use. Furthermore, the interleaving sheet must be stripped off the tape and must then be discarded. In short, the interleaving sheet while solving one problem introduces several more.

It is an object of this invention to prepare a pressure-sensitive organopolysiloxane-adhesive tape which will not deteriorate in storage. It is a further object to prepare a pressure-sensitive tape which can be easily peeled from a roll without deleterious effect to the adhesive surface. Another object is to prepare a pressure-sensitive tape which retains the adhesive in place preventing it from migrating into the backside of the tape thus avoiding a sticky surface when the tape is in use. Further objects and advantages obtained through this invention are detailed in or will be apparent from the following specification.

This invention relates to a pressure-sensitive tape comprising (A) a flexible backing consisting essentially of an organopolysiloxane free of organic silicates; (B) a coating of a silicone adhesive on one side of the backing (A); and (C) on the side opposite to the adhesive, a dried coating of a titanium compound having the general formula Ti(OR)$_4$ and aliphatic hydrocarbon soluble partial hydrolyzates thereof in which compound R is selected from the group consisting of aliphatic hydrocarbon radicals of less than 13 carbon atoms and hydroxylated aliphatic hydrocarbon radicals of less than 13 carbon atoms containing less than 4 hydroxyl radicals.

The accompanying drawing illustrates in section two embodiments of this invention. Figure I is a sectional view of a portion of a pressure-sensitive tape comprising an adhesive layer 10, a polymeric organosiloxane layer 11, and a layer of dried titanate ester 12. Figure II is a sectional view differing from Figure I in that the organosiloxane 11 is deposited on a fabric 13. For the sake of clarity, the various layers in Figures I and II have been exaggerated as to their size.

The flexible backings operative in this invention are organopolysiloxane resins or rubbers which are free of organic silicates and various fabrics coated with such resins or rubbers. The organopolysiloxane resins and rubbers, free of organic silicates, are polymers, copolymers and mixtures of units of the general formula

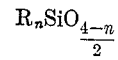

where R is any monovalent hydrocarbon radical or halogenated monovalent hydrocarbon radical and $n$ has an average value of from 1 to 2.1. The organic radicals attached to the silicon in the organopolysiloxane can be any combination of alkyl radicals such as methyl, ethyl and octadecyl; aryl radicals such as phenyl and anthracyl; alkaryl radicals such as tolyl, xylyl and methyl naphthyl; aralkyl radicals such as benzyl and phenylethyl; cycloaliphatic radicals such as cyclohexyl and cyclopentyl; alkenyl radicals such as vinyl and allyl, and halogenated monovalent hydrocarbon radicals such as chloromethyl, difluorophenyl, bromophenylethyl, trifluorovinyl and $\alpha,\alpha,\alpha$-trifluoromethylphenyl.

The flexible backing can be made up entirely of the defined organopolysiloxane or it can consist of a fabric such as glass cloth, asbestos cloth, cotton, nylon or other organic fabrics coated with such organopolysiloxane or it can be such organopolysiloxane with glass or other fibers or fillers imbedded therein.

The adhesives which are included within the scope of this invention are silicone adhesives and adhesives containing organopolysiloxanes. Illustrative of the adhesives included herein are partially vulcanized organosiloxanes such as are disclosed in U. S. Patent 2,460,795; and organopolysiloxane compositions comprising 5 to 70 per cent by weight of a benzene soluble resin copolymer of SiO$_2$ units and R$_3$SiO$_{1/2}$ units where R is an alkyl radical of less than 4 carbon atoms or a phenyl radical, and where the ratio of R$_3$SiO$_{1/2}$ units to SiO$_2$ units is from .6:1 to .9:1 inclusive, and 95 to 30 per cent by weight of a diorganopolysiloxane having the general formula R'$_2$SiO, where R' is methyl or phenyl and having a viscosity of at least 1,000,000 cs. at 25° C., and at least 90 per cent of the total number of R and R' radicals being alkyl.

It is apparent to one skilled in the art that this invention is not limited in scope to any particular siloxane adhesive and/or backing, and all silicone adhesives and backings are contemplated herein. However, this invention is especially important in those applications wherein the silicone adhesive is compatible with the organopolysiloxane in the backing.

The titanium compounds which are placed on the backside of the tape and upon drying prevent the adhesive from adhering to the "wrong" side of the tape are titanium esters having the general formula Ti(OR)$_4$ where R represents an aliphatic hydrocarbon radical of less than 13 carbon atoms and/or hydroxylated aliphatic hydrocarbon radicals of less than 13 carbon atoms and containing less than 4 hydroxyl radicals and/or partially hydrolyzed Ti(OR)$_4$ compounds that are substantially soluble in aliphatic hydrocarbon solvents. The various R groups on any one Ti atom can be the same or different. Examples of titanium compounds operative herein are tetramethyl titanate, tetraethyl titanate, tetradecyl titanate, octylene glycol titanate, tetra 2-ethylhexyl titanate, tetradodecyl titanate, tetraisopropyl titanate, and any mixtures thereof. It is preferred that the R groups contain at least 3 carbon atoms. These esters are prepared ordinarily by ester interchange of a titanium ester such as tetramethyl titanate with a higher boiling alcohol. For example, octylene glycol titanate is readily prepared by reacting octylene glycol with tetramethyl titanate in molar proportion of 4 to 1. Partially hydrolyzed Ti(OR)$_4$ compounds can be employed if the hydrolysis has not rendered the compounds insoluble in aliphatic solvents, such as Stoddard solvent. If partially hydrolyzed titanium compounds are employed, particular care is necessary to prevent undue formation of TiO$_2$. On the basis of commercial availability, tetrabutyl titanate is preferred.

The titanium compounds are applied to the tape from a solvent solution by any suitable means such as brushing, spraying and/or dipping. The solvent solution contains preferably .5 to 10% by weight of the titanium compound in an organic solvent such as xylene, Stoddard solvent and/or toluene. The titanium compound forms a continuous film as the solvent evaporates. It is preferred that relatively thin flexible films be formed rather than thick layers which tend to craze and crack-off because they lack flexibility.

The method of preparing the tapes of this invention is not critical. Many methods and variations are possible and are apparent to those skilled in the art. One method of preparing these tapes is set forth in the example following, but this invention is by no means restricted to that method.

Example 1

All parts and percentages expressed in this example are based on weight.

A tape backing of glass cloth was coated on both sides with a dimethylpolysiloxane polymer consisting of 100 parts of a high viscosity dimethylsiloxane having a plasticity of about 50, 40 parts of a fume silica filler, 20 parts of a diatomaceous earth available commercially at Celite Super Floss, 3 parts of iron oxide as Mapico Red, and 2.1 parts benzoyl peroxide. This tape was partially vulcanized by winding it on a steel drum and passing steam through the drum thus heating the drum to 120–130° C. for 2 to 3 minutes. This organopolysiloxane-glass cloth tape backing was cured for 5 minutes at 250° C.

One side of the tape prepared above was coated with a silicone adhesive consisting of 50 parts of an organosiloxane copolymer composed of (CH$_3$)$_3$SiO$_{1/2}$ units and SiO$_2$ units, having about 1.2 methyl units per silicon atom in the copolymer, 50 parts of a dimethylsiloxane having a viscosity in excess of 10,000,000 cs. at 25° C., having a plasticity of 55, and 2.5 parts of benzoyl peroxide in solution in 50 parts xylene (i. e. 50 per cent siloxane solids in xylene solution). The coating was brushed on the tape and the solvent was allowed to evaporate leaving the silicone adhesive in place. The entire tape was then heated at 150° C. for 5 minutes. The tape was cooled and tetrabutyltitanate in the form of a 2 per cent solution of the titanate in V. M. and P. naphtha was brushed on the tape on the side opposite to the adhesive. The naphtha solvent evaporated leaving a thin, flexible dry film of the titanate. The tape was rolled up in the form commercially employed for pressure-sensitive tapes. A second tape prepared as above except for the application of the titanium compound, which step was omitted, was also rolled. The tapes were subjected to an accelerated shelf-life test by being stored in an oven at 70° C. At the end of a single day of storage, the control tape had deteriorated seriously. The adhesive had become stringy and the backside of the tape was tacky. In short, the control tape exhibited poor storage properties. The tape prepared with the titanium compound coating on the backside was in excellent condition after one day of storage at 70° C. and has shown no deterioration in the adhesive surface, and no migration of the adhesive into the backside of the tape after 30 days of such high temperature storage.

Example 2

Equivalent results are obtained when tetra 2-ethyl-hexyl titanate, octylene glycol titanate, tetra isopropyl titanate, tetramethyl titanate, tetradodecyl titanate and/or $$Ti(OCH_2CH_2CH_2CH=CH_2)_4$$

is substituted for the tetrabutyl titanate in the method of Example 1.

That which is claimed is:

1. A pressure-sensitive tape comprising: (A) a flexible backing consisting essentially of an organopolysiloxane free of organic silicates, (B) on one side of said flexible backing, a coating of a silicone adhesive; and (C) on the side opposite the silicone adhesive, a dried coating of a titanium compound selected from the group consisting of titanium compounds having the general formula Ti(OR)$_4$ and aliphatic hydrocarbon soluble partial hydrolyzates thereof in which compounds R is selected from the group consisting of aliphatic hydrocarbon radicals of less than 13 carbon atoms, and hydroxylated aliphatic hydrocarbon radicals of less than 13 carbon atoms and containing less than 4 hydroxy radicals.

2. A pressure-sensitive tape comprising: (A) a flexible backing consisting essentially of a methylpolysiloxane elastomer; (B) coated on the flexible backing (A), a silicone adhesive consisting essentially of a mixture of 5 to 70 per cent by weight of a benzene soluble methylpolysiloxane resin copolymer containing (CH$_3$)$_3$SiO$_{1/2}$ units and SiO$_2$ units, containing in the range of .6 to .9 inclusive (CH$_3$)$_3$SiO$_{1/2}$ units per SiO$_2$ unit in the copolymer and 30 to 95 per cent by weight of a dimethylpolysiloxane having a viscosity of at least 1,000,000 cs. at 25° C., and (C) on the flexible backing (A) on the side opposite to the adhesive (B), a dried coating of tetrabutyl titanate.

3. A pressure-sensitive tape comprising: (A) a flexible backing consisting essentially of a methylpolysiloxane elastomer; (B) coated on the flexible backing (A), a silicone adhesive consisting essentially of a mixture of 5 to 70 per cent by weight of a benzene soluble methylpolysiloxane resin copolymer containing (CH$_3$)$_3$SiO$_{1/2}$ units and SiO$_2$ units, containing in the range of .6 to .9 inclusive (CH$_3$)$_3$SiO$_{1/2}$ units per SiO$_2$ unit in the copolymer and 30 to 95 per cent by weight of a dimethylpolysiloxane having a viscosity of at least 1,000,000 cs. at 25° C. and (C) on the side opposite the silicone adhesive, a dried coating of a titanium compound selected from the group consisting of titanium compounds having the general formula Ti(OR)$_4$ and aliphatic hydrocarbon soluble partial hydrolyzates thereof in which compounds R is selected from the group consisting of aliphatic hydrocarbon radicals of less than 13 carbon atoms, and hydroxylated aliphatic hydrocarbon radicals of less than 13 carbon atoms and containing less than 4 hydroxy radicals.

References Cited in the file of this patent

UNITED STATES PATENTS 2,708,289     Collings _____ May 17, 1955